(12) United States Patent
Kang et al.

(10) Patent No.: US 7,774,505 B2
(45) Date of Patent: Aug. 10, 2010

(54) METHOD FOR TRANSMITTING IMAGE DATA IN REAL-TIME

(75) Inventors: Tae-Young Kang, Uijeongbu-si (KR);
Woo-Hyuk Choi, Yongin-si (KR);
Noh-Kyung Hong, Seoul (KR);
Chang-Hoon Lee, Incheon (KR);
Byeong-Cheol Hwang, Seoul (KR);
Jae-Hyun Park, Seoul (KR); Bong-Hee Kim, Cheonan-si (KR)

(73) Assignee: Samsung Electronics Co., Ltd (KR)

( * ) Notice: Subject to any disclaimer, the term of this patent is extended or adjusted under 35 U.S.C. 154(b) by 1140 days.

(21) Appl. No.: 11/368,757

(22) Filed: Mar. 6, 2006

(65) Prior Publication Data

US 2006/0209802 A1    Sep. 21, 2006

(30) Foreign Application Priority Data

Mar. 5, 2005   (KR) ...................... 10-2005-0018474
Nov. 21, 2005  (KR) ...................... 10-2005-0111357

(51) Int. Cl.
*H04J 3/24*    (2006.01)
*G06F 15/16*   (2006.01)

(52) U.S. Cl. ........................ 709/249; 709/208; 709/223; 345/173; 370/349

(58) Field of Classification Search ................ 709/759, 709/208, 223, 249; 345/173
See application file for complete search history.

(56) References Cited

U.S. PATENT DOCUMENTS 7,346,342 B2 *  3/2008  Kirbas ........................ 455/415

(Continued)

FOREIGN PATENT DOCUMENTS

CN       1665320       9/2005

(Continued)

OTHER PUBLICATIONS

Jian Zhai et al., A Cooperative Image Editing Tool Over Mobile Phones, Proceedings of the 11th International Multimedia Modeling Conference, Jan. 12, 2005.

(Continued)

*Primary Examiner*—Patrick N Edouard
*Assistant Examiner*—Julio Perez
(74) *Attorney, Agent, or Firm*—The Farrell Law Firm, LLP

(57) ABSTRACT

Disclosed is a method for transmitting image data in real-time between mobile communication terminals in a mobile communication system, the mobile communication system including a host mobile communication terminal, at least one client mobile communication terminal, an SMS server, and a PDSN assigning IP addresses. The method includes when an IP address is received from the PDSN, transmitting by the host mobile communication terminal an invite message to the client mobile communication terminal via the SMS server; receiving by the client mobile communication terminal an IP address from the PDSN, and transmitting a register message to the host mobile communication terminal via the PDSN; updating by the host mobile communication terminal a buddy list, and transmitting the updated buddy list to the client mobile communication terminal via the PDSN; and exchanging by the host and the client mobile communication terminals the image data in real-time based on the updated buddy list.

11 Claims, 14 Drawing Sheets

U.S. PATENT DOCUMENTS

| | | | |
|---|---|---|---|
| 2002/0086672 A1* | 7/2002 | McDowell et al. | 455/432 |
| 2003/0231190 A1* | 12/2003 | Jawerth et al. | 345/660 |
| 2005/0104864 A1* | 5/2005 | Zhang et al. | 345/173 |
| 2005/0143053 A1* | 6/2005 | Virtanen et al. | 455/414.1 |
| 2005/0197143 A1 | 9/2005 | Lee et al. | |
| 2005/0220041 A1 | 10/2005 | Lin | |
| 2006/0150109 A1* | 7/2006 | Schultz et al. | 715/759 |
| 2009/0164595 A1* | 6/2009 | Shiigi | 709/206 |

FOREIGN PATENT DOCUMENTS

| | | |
|---|---|---|
| EP | 1 331 786 | 7/2003 |
| EP | 1 571 791 | 9/2005 |
| KR | 2002-0054450 | 7/2002 |
| KR | 2004-0047385 | 6/2004 |
| KR | 1020040045773 | 6/2004 |
| KR | 1020040096331 | 11/2004 |
| KR | 1020040100243 | 12/2004 |
| KR | 1020040108104 | 12/2004 |
| TW | 527789 | 4/2003 |
| TW | 536893 | 6/2003 |

OTHER PUBLICATIONS

Karsten Loesing et al., An Implementation of Reliable Group Communication Based on the Peer-to-Peer Network JXTA, The $3^{rd}$ ACS/IEEE International Conference on Computer Systems and Applications, Jan. 3, 2005.

Gerald Friedland et al., E-Chalk Technical Description, Aug. 28, 2001.

Gadi Shamir, Shared Whiteboard: A Java Application in the Transis Environment, Oct. 30, 1996.

Anonymous: Windows Net Meeting—Features, Jun. 17, 1999.

\* cited by examiner

METHOD FOR TRANSMITTING IMAGE DATA IN REAL-TIME

PRIORITY

This application claims priority to an application entitled "Method For Transmitting Image Data in Real-time" filed in the Korean Intellectual Property Office on Mar. 5, 2005 and assigned Serial No. 2005-18474 and on Nov. 21, 2005 and assigned Serial No. 2005-111357, the contents of which are incorporated herein by reference.

BACKGROUND OF THE INVENTION

1. Field of the Invention

The present invention relates to a data transmission method of a mobile communication terminal, and more particularly to a method for transmitting image data in real-time between mobile communication terminals.

2. Description of the Related Art

It is common that mobile communication terminal users exchange information, such as the location of an appointment, a phone number, an e-mail address and a bank account number, by voice during communication. However, the information may be inaccurately transferred by voice. In addition, in environments having bad communication sensitivity, the accuracy of information transfer may increasingly deteriorate.

SUMMARY OF THE INVENTION

Accordingly, the present invention has been made to solve the above-mentioned problems occurring in the prior art, and it is an object of the present invention to provide a method for transmitting image data in real-time between mobile communication terminals through an existing mobile communication wireless network.

In order to accomplish the aforementioned object, according to one aspect of the present invention, there is provided a method for transmitting image data in real-time between mobile communication terminals by means of a mobile communication system, the mobile communication system including a host mobile communication terminal, at least one client mobile communication terminal, an SMS server providing an SMS service to the mobile communication terminals, and a Packet Data Serving Node (PDSN) assigning Internet Protocol (IP) addresses through a Point-To-Point (P2P) protocol connection with the mobile communication terminals, the method including when an IP address is received from the PDSN for an application of transmitting the image data in real-time, transmitting by the host mobile communication terminal an invite message including the IP address to the client mobile communication terminal via the SMS server; after receiving the invite message, receiving by the client mobile communication terminal an IP address from the PDSN, and transmitting a register message including the IP address to the host mobile communication terminal via the PDSN; updating by the host mobile communication terminal a buddy list for communication partners based on the register message, and transmitting the updated buddy list to the client mobile communication terminal via the PDSN; and exchanging by the host and the client mobile communication terminals the image data in real-time with each other based on the updated buddy list.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein below with reference to the accompanying drawings. In the following description, a detailed description of known functions and configurations incorporated herein will be omitted when it may obscure the subject matter of the present invention.

Figure 1:
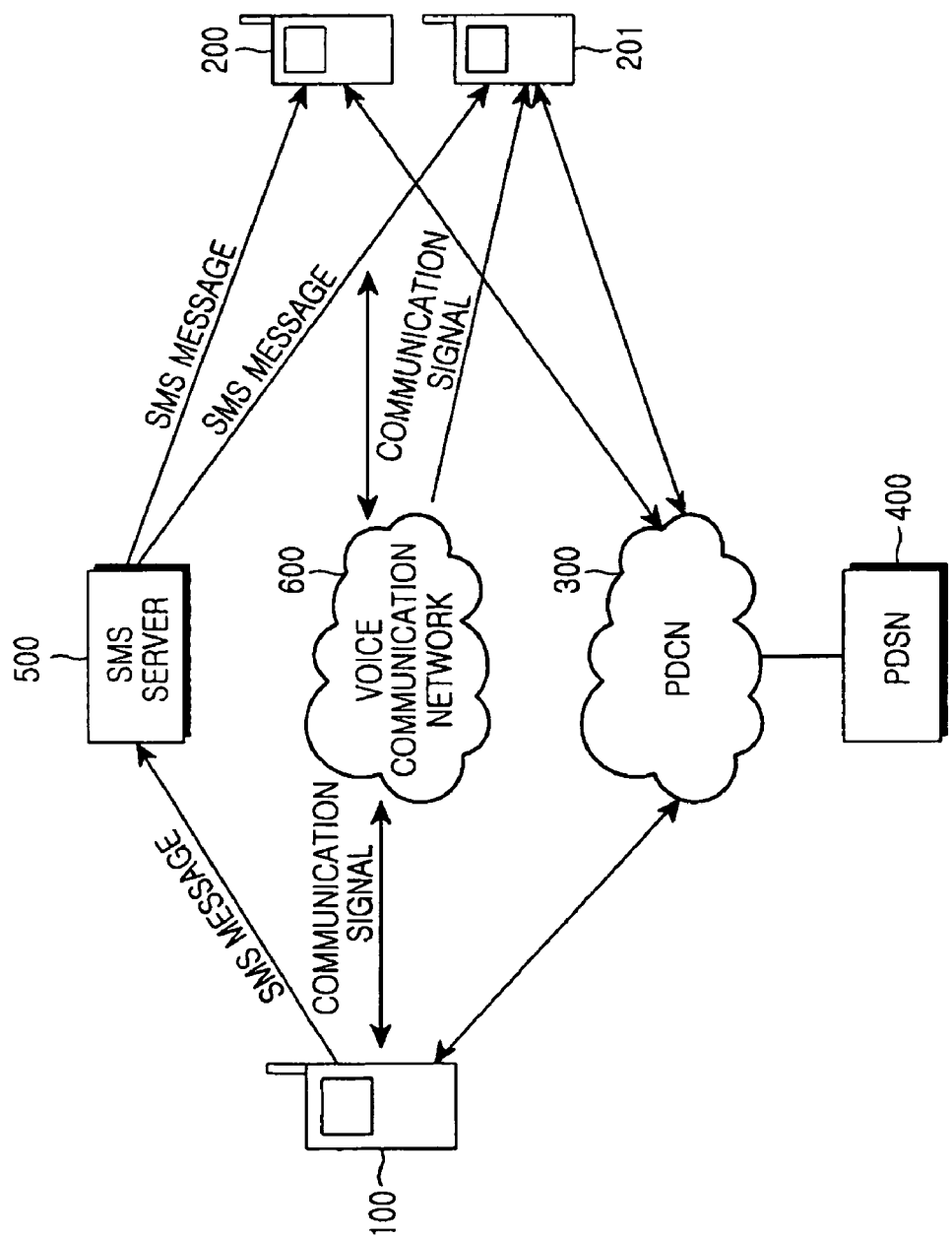
FIG. 1 is a schematic diagram illustrating the construction of a mobile communication system for transmitting/receiving data in real-time between mobile communication terminals according to a preferred embodiment of the present invention.

FIG. 1 is a schematic diagram illustrating the construction of a mobile communication system for transmitting/receiving data in real-time between mobile communication terminals according to a preferred embodiment of the present invention.

Referring to FIG. 1, a host mobile communication terminal 100 and client mobile communication terminals 200 and 201 establish a Point-To-Point (P2P) communication channel with a Packet Data Serving Node (PDSN) 400 through a Packet Data Core Network (PDCN) 300, respectively, thereby performing mutual packet data communication.

The host mobile communication terminal 100 and the client mobile communication terminals 200 and 201 include a messenger program for using a messenger service, respectively.

If messenger-operating signals are input, the host mobile communication terminal 100 executes the stored messenger program regardless of whether voice communication is performed. If signals requesting communication through the messenger service are input from the users of the client mobile communication terminals 200 and 201, the host mobile communication terminal 100 generates a list of communication partners, i.e. a buddy list, registered through the respective messenger program of the selected mobile communication terminals 200 and 201.

The host mobile communication terminal 100 performs a P2P protocol connection with the PDSN 400 through the PDCN 300 in order to acquire an Internet Protocol (IP) address. If the P2P protocol connection with the PDSN 400 is successfully established, the host mobile communication terminal 100 receives the IP address from the PDSN 400. After receiving the IP address from the PDSN 400, the host mobile communication terminal 100 transmits an invite message including the IP address in the form of an SMS to the client mobile communication terminals 200 and 201 through an SMS server 500.

The host mobile communication terminal 100 determines if register messages are received from the client mobile communication terminals 200 and 201 through the PDCN 300 as a response message for the invite message for a preset time period. If the register messages are received, the host mobile communication terminal 100 updates the buddy list on the basis of the register messages, and transmits the updated buddy list to the client mobile communication terminals 200 and 201.

If the invite message is received from the host mobile communication terminal 100 through the SMS server 500, each of the client mobile communication terminals 200 and 201 executes the stored messenger program. Each of the client mobile communication terminals 200 and 201 detects basic information of the host mobile communication terminal 100, which includes the IP address of the host mobile communication terminal 100, from the invite message. Each of the client mobile communication terminals 200 and 201 performs the P2P protocol connection with the PDSN 400 through the PDCN 300. If the P2P protocol connection with the PDSN 400 is successfully established, each of the client mobile communication terminals 200 and 201 receives IP addresses from the PDSN 400.

Each of the client mobile communication terminals 200 and 201 generates register messages including their IP addresses. Then, each of the client mobile communication terminals 200 and 201 transmits the register messages to the host mobile communication terminal 100 via the PDCN 300. If each of the client mobile communication terminals 200 and 201 receives the buddy list from the host mobile communication terminal 100 after transmitting the register messages, each of the client mobile communication terminals 200 an d 201 updates previously stored buddy lists on the basis of the received buddy list. The buddy list includes address information registered for use of the messenger service through the host mobile communication terminal 100 and the client mobile communication terminals 200 and 201. Accordingly, the host mobile communication terminal 100 and the client mobile communication terminals 200 and 201 include the updated buddy lists, respectively, and they can use a messenger service with other mobile communication terminals registered to addresses corresponding to the buddy lists.

Among the host mobile communication terminal 100 and the client mobile communication terminals 200 and 201, a mobile communication terminal having received messenger service termination signals transmits a messenger service termination message to the other mobile communication terminals having used the messenger service through the PDCN 300. Among the host mobile communication terminal 100 and the client mobile communication terminals 200 and 201, mobile communication terminals having received the messenger service termination message update their own buddy lists and delete information of the mobile communication terminal which transmitted the messenger service termination message. In this way, the host mobile communication terminal 100 and the client mobile communication terminals 200 and 201 can check the status of mobile communication terminals which are using the messenger service in real-time.

Figure 2:
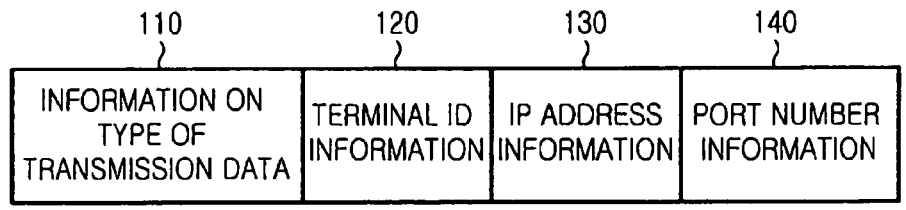
FIG. 2 is a diagram illustrating the structure of an invite message transmitted from the host mobile communication terminal to the client mobile communication terminals in FIG. 1.

FIG. 2 is a diagram illustrating the structure of an invite message transmitted from the host mobile communication terminal to the client mobile communication terminals in FIG. 1.

Referring to FIG. 2, the invite message includes information 110 on the type of transmission data, ID information 120 of the host mobile communication terminal 100, information 130 about an IP address assigned to the host mobile communication terminal 100, and port number information 140.

The information 110 represents information on the type of transmitted data, which is an SMS message denoting the invite message. The ID information 120 represents authentication information of the host mobile communication terminal 100, which for example, may include phone number information. The information 130 represents information about an IP address assigned to the host mobile communication terminal 100. The port number information 140 represents information about a port number assigned to the host mobile communication terminal 100.

Figure 3:
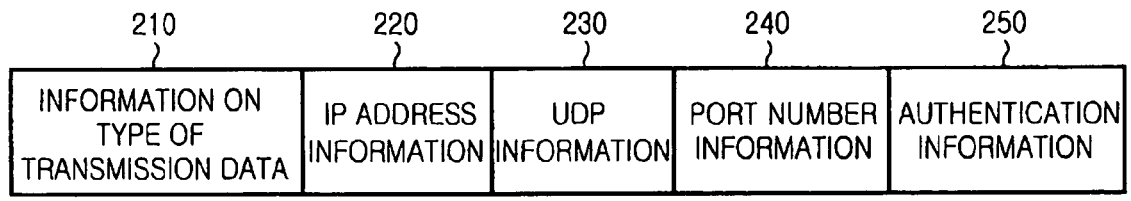
FIG. 3 is a diagram illustrating the structure of a register message transmitted from the client mobile communication terminals to the host mobile communication terminal in FIG. 1.

FIG. 3 is a diagram illustrating the structure of a register message transmitted from the client mobile communication terminals to the host mobile communication terminal in FIG. 1.

Referring to FIG. 3, the register message includes information 210 on the type of transmission data, IP address information 220, User Datagram Protocol (UDP) information 230, port number information 240 and authentication information 250.

The information 210 represents information on the type of transmitted data, which is a message denoting the register message. The IP address information 220 includes IP address information of the host mobile communication terminal 100 and the client mobile communication terminals 200 and 201. The UDP information 230 includes UDP information of the host mobile communication terminal 100 and the client mobile communication terminals 200 and 201. The port number information 240 represents information for port numbers assigned to the client mobile communication terminals 200 and 201. The authentication information 250 includes subscriber information (e.g. phone number information) necessary for authentication of the client mobile communication terminals 200 and 201.

Figure 4:
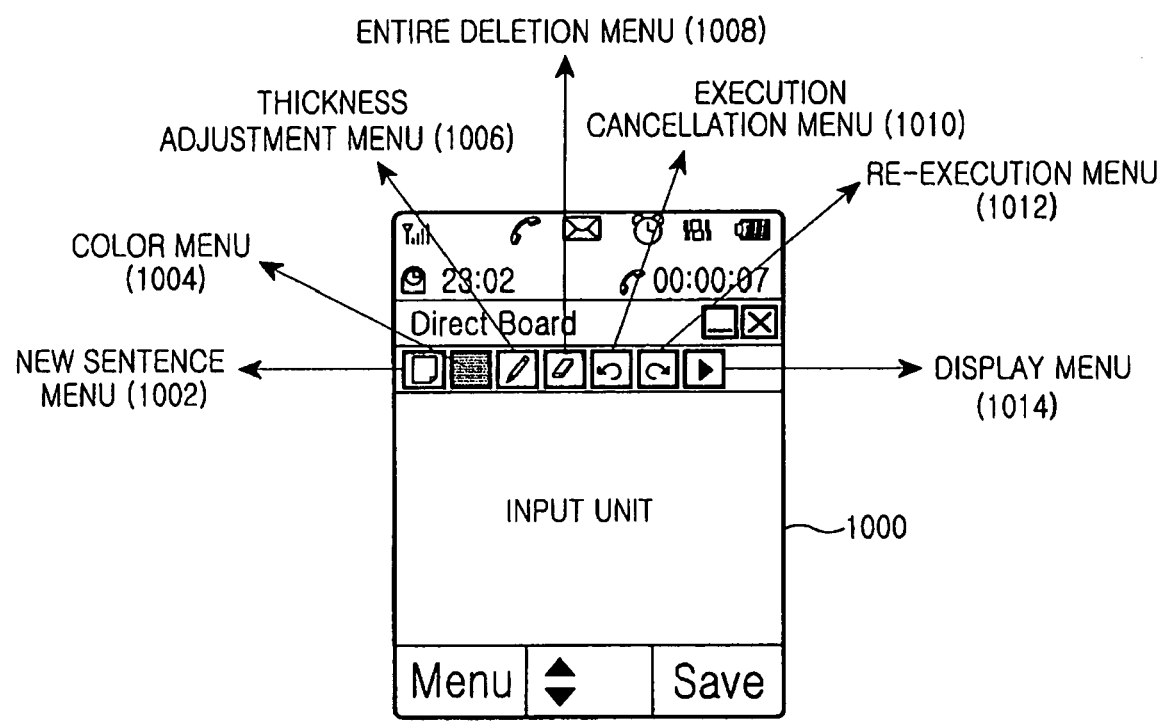
FIG. 4 is a diagram illustrating a direct board according to a preferred embodiment of the present invention.

In the meantime, since the messenger service as described above is provided through a separate data network other than a voice communication network 600 (FIG. 1), the host mobile communication terminal 100 and the client mobile communication terminals 200 and 201 may use the messenger service and simultaneously exchange communication signals with one another through the voice communication network 600, to allow users of the host mobile communication terminal 100 and the client mobile communication terminals 200 and 201 to use the messenger service while performing voice communication with one another. In order to simultaneously and efficiently use the voice communication and the messenger service as described above, the present invention provides the messenger service using a direct board. The direct board represents an application used when users of the host mobile communication terminal 100 and the client mobile communication terminals 200 and 201 draw desired images with a stylus pen or a touch screen while performing communication. Hereinafter, a screen on which the direct board is executed will be described in detail with reference to FIG. 4.

The direct board includes an input unit 1000 for drawing images, a new sentence menu 1002 for initializing the input unit 1000 in order to draw new images, a color menu 1004 for selecting the color of an input image line, a thickness adjustment menu 1006 for adjusting the thickness of the input image line, an entire deletion menu 1008 for deleting all drawn images, an execution cancellation menu 1010 for canceling drawn images, a re-execution menu 1012 for restoring the image cancelled by the execution cancellation menu 1010, and a display menu 1014 for reproducing an image drawing process. The users of the host mobile communication terminal 100 and the client mobile communication terminals 200 and 201 can write the location of an appointment, a phone number, an e-mail address, a bank account number, etc., using the direct board during communication, and can exchange it with one another.

Figure 5:
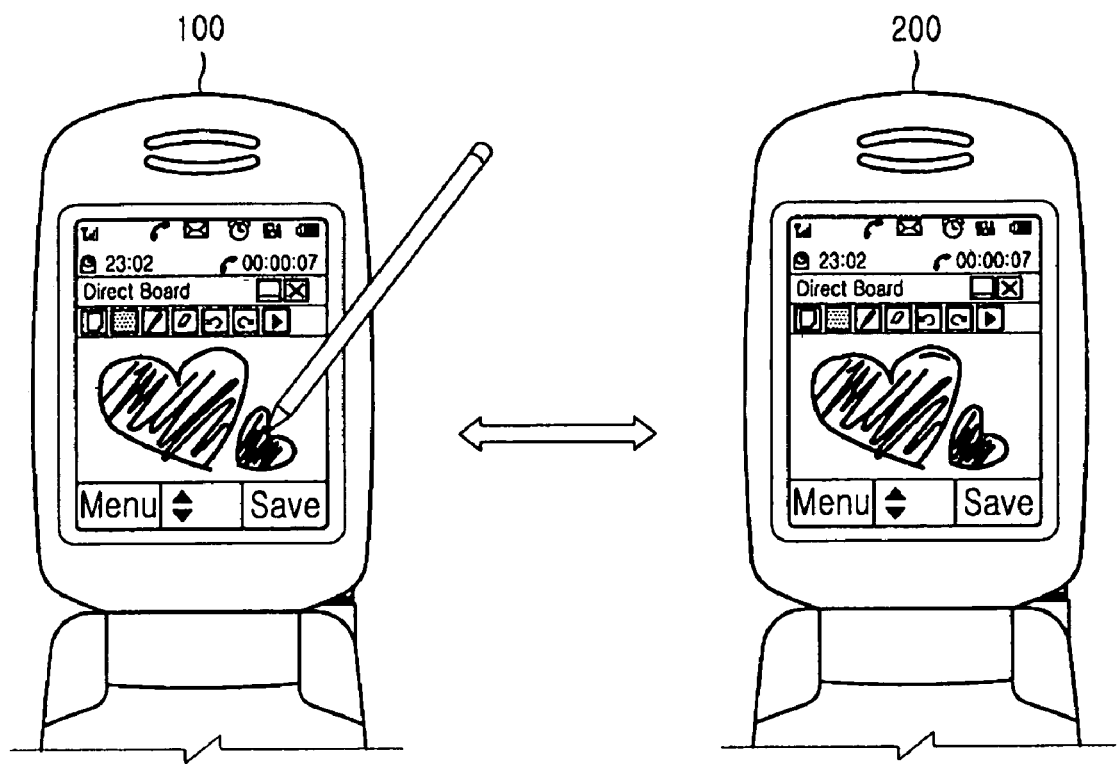
FIG. 5 illustrates a mobile communication terminal for transmitting/receiving in real-time data drawn on the direct board in FIG. 4 according to a preferred embodiment of the present invention.

Whenever a user draws an image by means of the direct board, the mobile communication terminal of the user transmits the drawn image in real-time. For example, if the user of the host mobile communication terminal 100 draws a heart shape with a stylus pen as illustrated in FIG. 5, the host mobile communication terminal 100 transmits the entire process, in which the heart shape is drawn, to the client mobile communication terminals 200 and 201 in real-time. Accordingly, the input unit 1000 of the direct board included in the client mobile communication terminal 200 displays the entire drawing process as the user of the host mobile communication terminal 100 directly draws the heart shape. Hereinafter, a process in which the image drawn on the direct board of the host mobile communication terminal 100 is displayed in real-time on the direct board of the client mobile communication terminal 200 will be described in detail with reference to FIGS. 6 to 8.

Figure 6:
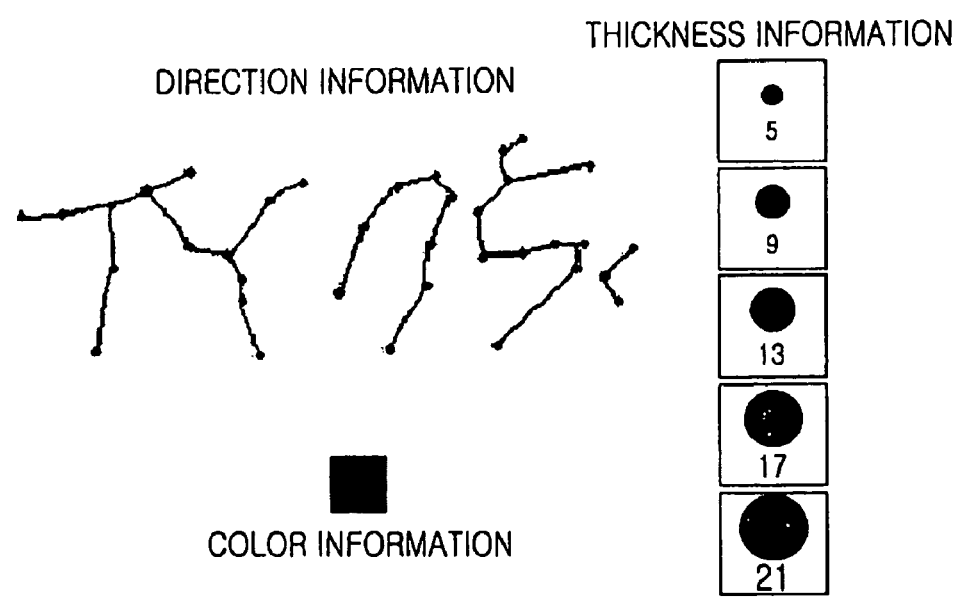
FIG. 6 is a diagram illustrating an image which a user has drawn on the direct board in FIG. 5 with a stylus pen.

FIG. 6 is a diagram illustrating an image which a user has drawn on the direct board in FIG. 5 with a stylus pen.

Information for the image which the user has drawn on the direct board with the stylus pen includes direction information of the image line, color information and thickness information. The direction information of the image line may include horizontal and vertical coordinates, and the color information may include combinations of RGB values. The thickness information may include values set through the thickness adjustment menu 1006, or numerical values corresponding to the degree in which the stylus pen used by the user presses a touch pad. That is, the thickness of the image line drawn on the input unit changes in proportion to the force with which the user presses against the touch pad with the stylus pen. Accordingly, variation of the thickness may be the thickness information.

Figures 7A, 7B, 7C:
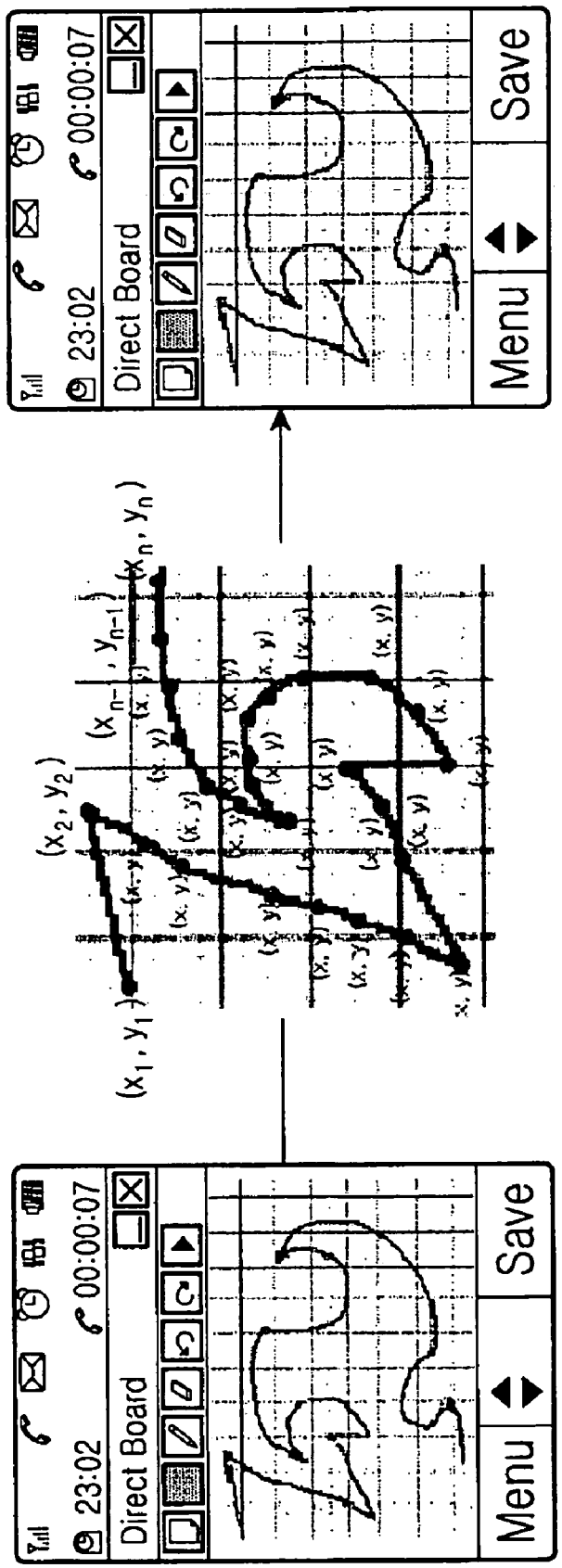
FIGS. 7 and 8 are diagrams illustrating a process of transmitting in real-time the image drawn on the direct board in FIG. 5.

When the user draws the image on the input unit 1000 of the direct board in the host mobile communication terminal 100 with the stylus pen as illustrated in FIG. 7A, the horizontal and vertical coordinates included in the direction information of the image line correspond to horizontal and vertical coordinates of the image line scanned by the host mobile communication terminal 100 in a predetermined time interval. Further, the host mobile communication terminal 100 determines all horizontal and vertical coordinates, which are scanned between horizontal and vertical coordinates scanned when the stylus pen contacts the touch pad for the first time and horizontal and vertical coordinates scanned when the stylus pen separates from the touch pad, as information for forming one image line.

FIG. 7B illustrates coordinates which the host mobile communication terminal 100 scans and computes the image drawn on the direct board in a predetermined time interval. The host mobile communication terminal 100 transmits horizontal and vertical coordinates (i.e. $x_1$ and $y_1$) scanned when the stylus pen contacts the touch pad for the first time to the client mobile communication terminals 200 and 201 in real-time. Herein, the host mobile communication terminal 100 also transmits color and thickness information at the coordinates $x_1$ and $y_1$, and information reporting the beginning of one image line to the client mobile communication terminals 200 and 201. Then, each of the client mobile communication terminals 200 and 201 displays in real-time the beginning point of the image line at the coordinates $x_1$ and $y_1$ of its own input unit according to the color and thickness information received from the host mobile communication terminal 100. Each of the client mobile communication terminals 200 and 201 determines the coordinates $x_1$ and $y_1$ as the beginning point of the image line according to the information reporting the beginning of one image line, which has been received from the host mobile communication terminal 100.

After detecting the coordinates $x_1$ and $y_1$, the host mobile communication terminal 100 transmits coordinates $x_2$ and $y_2$, which have been scanned after a predetermined time passes, to the client mobile communication terminals 200 and 201 in real-time. Herein, the host mobile communication terminal 100 also transmits color and thickness information at the coordinates $x_2$ and $y_2$ to the client mobile communication terminals 200 and 201. Accordingly, each of the client mobile communication terminals 200 and 201 draws a line from the coordinates $x_1$ and $y_1$ to the coordinates $x_2$ and $y_2$ on its own input unit, adjusts the color and thickness of the drawn image line according to the color and thickness information received from the host mobile communication terminal 100, and displays the image line in real-time.

While the user draws the image with the stylus pen, the host mobile communication terminal 100 scans horizontal and vertical coordinates in real-time in the same manner, and transmits the scanned horizontal and vertical coordinates to the client mobile communication terminals 200 and 201 together with color and thickness information at the scanned coordinates. Then, each of the client mobile communication terminals 200 and 201 draws new image lines based on the newly received coordinates on its own input unit, adjusts the color and thickness of the drawn image lines according to the newly received color and thickness information, and displays the image lines in real-time. In this way, whenever the user of the host mobile communication terminal 100 draws an image with the stylus pen as illustrated in FIG. 7A, the drawing process of the image is transmitted to the client mobile communication terminals 200 and 201 in real-time. Accordingly, the input unit of the direct board included in the client mobile communication terminal 200 displays the drawing process as illustrated in FIG. 7C, as the user of the host mobile communication terminal 100 directly draws the image.

Further, when the host mobile communication terminal 100 transmits horizontal and vertical coordinates (i.e. $X_n$ and $Y_n$) scanned at the point in time at which the stylus pen separates from the touch pad to the client mobile communication terminals 200 and 201 in real-time, the host mobile communication terminal 100 transmits color and thickness information, and information reporting the ending of one image line. Accordingly, each of the client mobile communication terminals 200 and 201 draws a line from coordinates $X_{n-1}$ and $Y_{n-1}$ to the coordinates $X_n$ and $Y_n$ on its own input unit, adjusts the color and thickness of the drawn image line according to the color and thickness information received from the host mobile communication terminal 100, and displays the image line in real-time. Further, each of the client mobile communication terminals 200 and 201 determines the image line to the coordinates $X_n$ and $Y_n$ as one independent image according to the information reporting the ending of one image line, which has been received from the host mobile communication terminal 100. As a result, if new horizontal and vertical coordinates, and new color and thickness information are received from the host mobile communication terminal 100, each of the client mobile communication terminals 200 and 201 displays a beginning point for drawing a new image without drawing a line between the new horizontal and vertical coordinates and the coordinates $X_n$ and $Y_n$.

Figure 8:
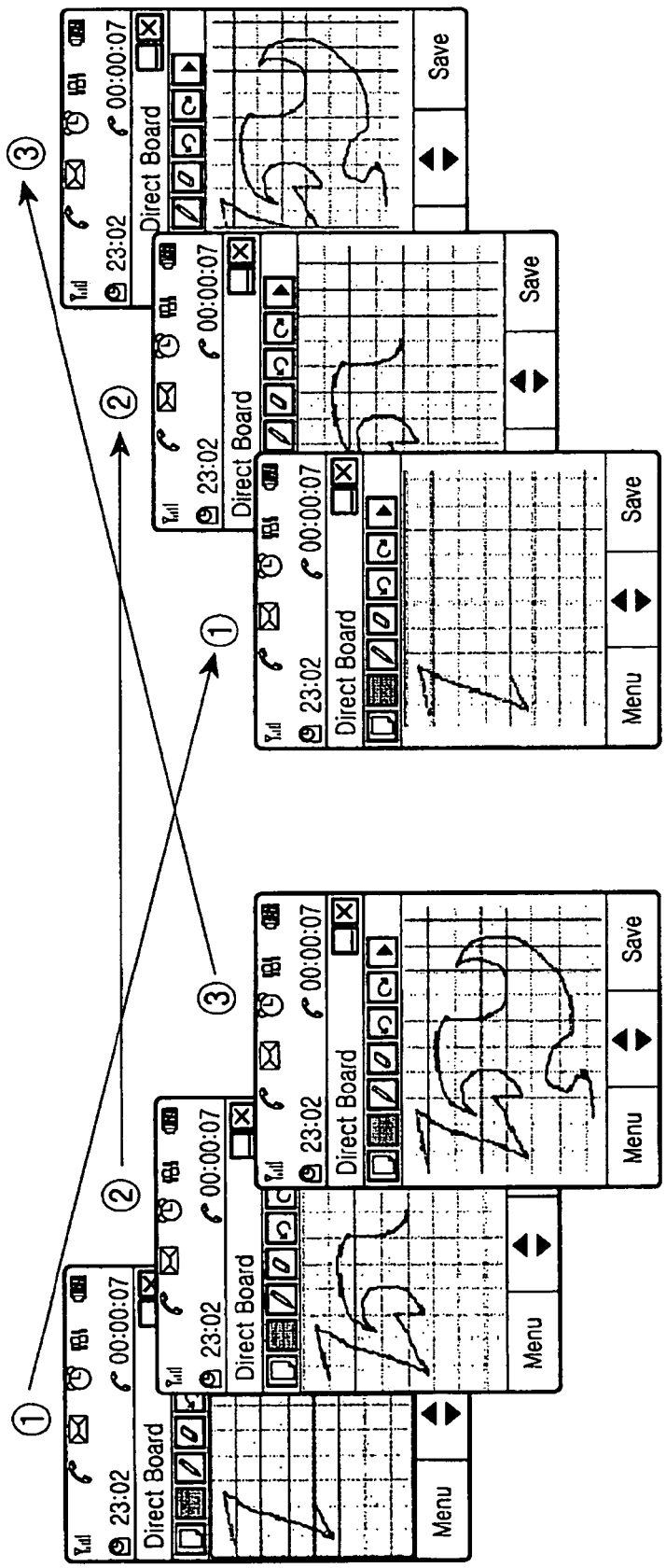

Whenever the user of the host mobile communication terminal 100 draws the image with the stylus pen, the drawing process of the image is transmitted to the client mobile communication terminals 200 and 201 in real-time, so that the image is displayed on the input unit 1000 of the direct board included in each of the client mobile communication terminals 200 and 201. This process is as illustrated in FIG. 8. In the present invention, when a mobile communication network simultaneously uses a voice communication network and a data communication network, a user may use the direct board together with voice communication. If the mobile communication network does not simultaneously use the voice communication network and the data communication network, a user may use the direct board together with a messenger, or may use only the direct board. A case of using the direct board together with voice communication will be described with reference to FIGS. 9 to 12.

Figure 9:
FIGS. 9 to 12 are diagrams illustrating a process of using a direct board together with voice communication according to a preferred embodiment of the present invention.
Figure 10:
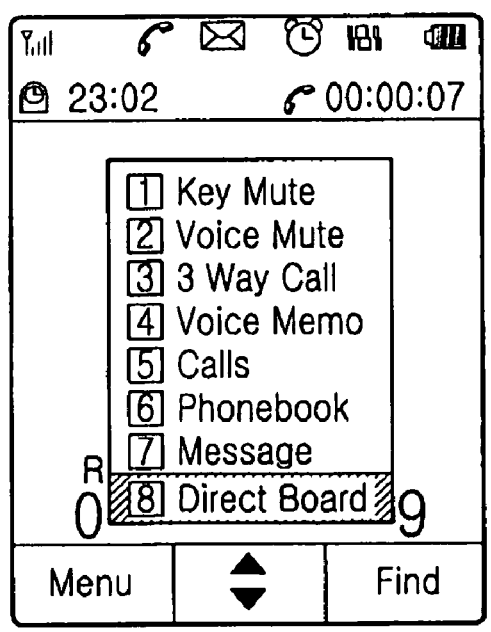
Figure 11:
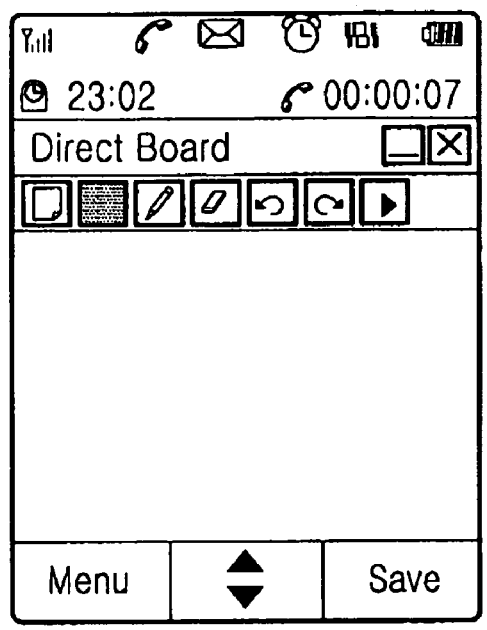
Figure 12:
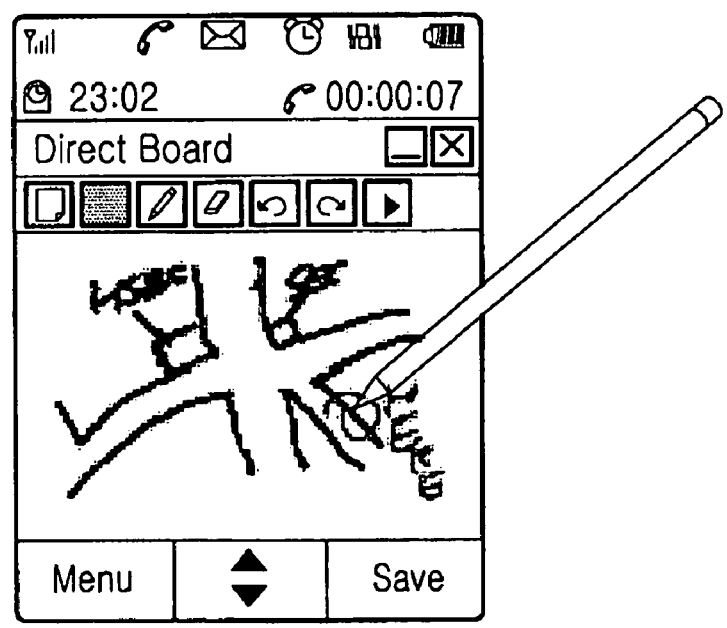

If the user of the host mobile communication terminal 100 makes a request for entering a menu including the direct board, the host mobile communication terminal 100 displays the menu including the direct board as illustrated in FIG. 10 in a state of displaying a screen for the voice communication as illustrated in FIG. 9. The user having checked the menu of FIG. 10 may select the direct board by pressing a number key 8 or by moving a cursor by means of a direction key in order to use the direct board. If the user selects the direct board in a state in which the menu of FIG. 10 is displayed, the host mobile communication terminal 100 executes the direct board. The initial screen of the executed direct board is as illustrated in FIG. 11, and the user continuously draws an image with the stylus pen as illustrated in FIG. 12 during voice communication.

Hereinafter, the process in which a user simultaneously uses the messenger and the direct board will be described with reference to the diagrams of FIGS. 13 to 15.

Figure 13:
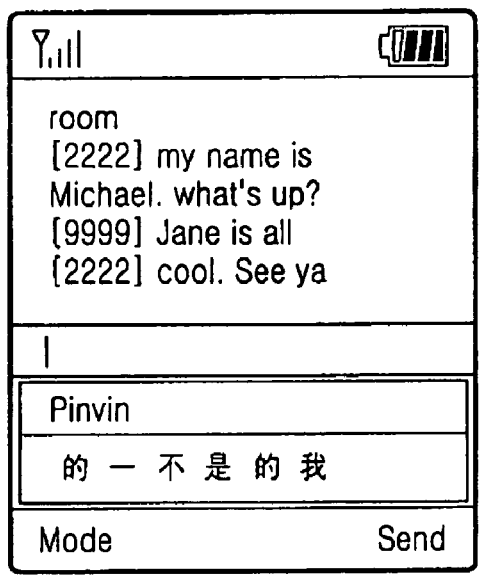
FIGS. 13 to 15 are diagrams illustrating a process of using a direct board together with a messenger according to a preferred embodiment of the present invention.
Figure 14:
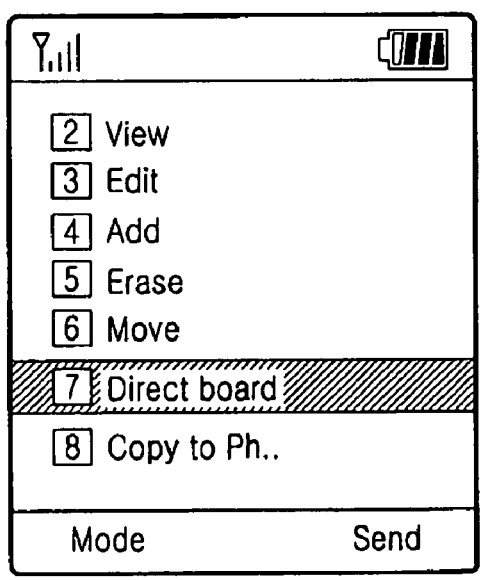
Figure 15:
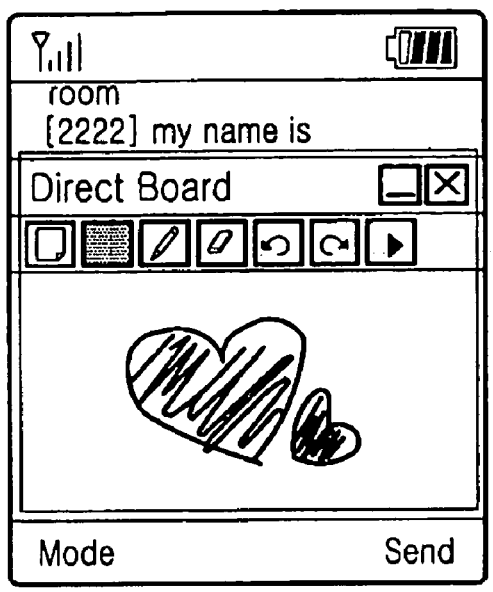

If the user of the host mobile communication terminal 100 makes a request for entering a menu including the direct board while using the messenger, the host mobile communication terminal 100 displays the menu including the direct board as illustrated in FIG. 14 in a state of displaying a screen for the messenger as illustrated in FIG. 13. The user having checked the menu of FIG. 14 may select the direct board by pressing a number key 7 or by moving a cursor by means of a direction key in order to use the direct board. If the user selects the direct board in a state in which the menu of FIG. 14 is displayed, the host mobile communication terminal 100 executes the direct board. FIG. 15 illustrates a screen including an image drawn by the user in a state in which the direct board has been executed.

Hereinafter, a case in which a user uses only the direct board will be described with reference to the diagrams of FIGS. 16 to 18.

Figure 16:
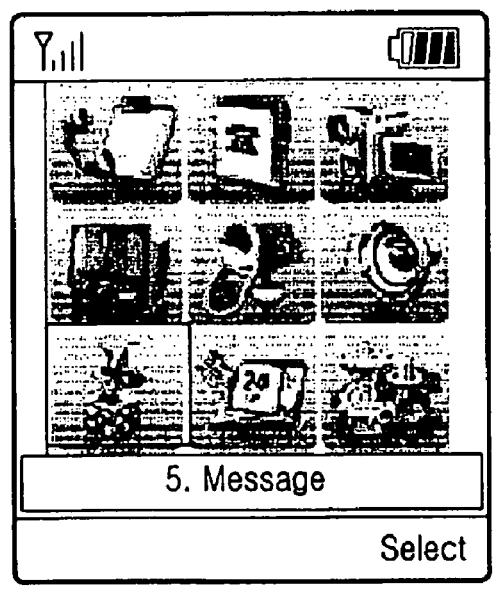
FIGS. 16 to 18 are diagrams illustrating a process of using a direct board according to a preferred embodiment of the present invention.
Figure 17:
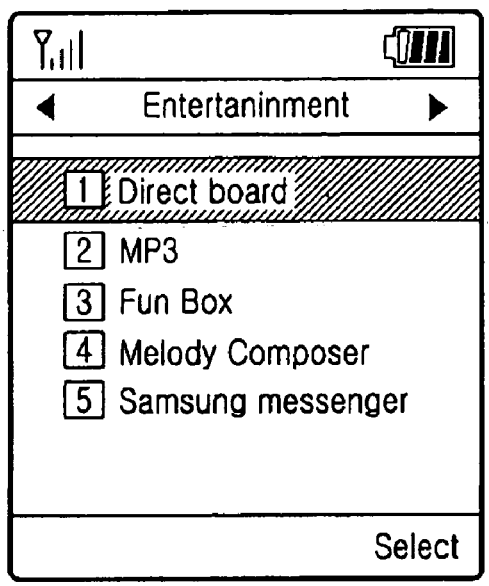
Figure 18:
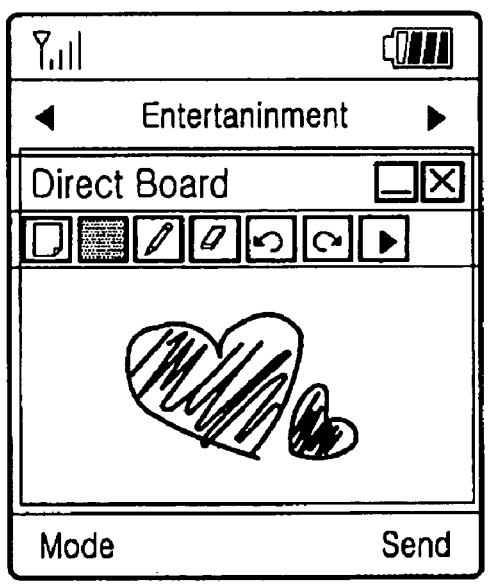

If the user of the host mobile communication terminal 100 makes a request for entering a menu including the direct board in an initial menu screen of the host mobile communication terminal 100 as illustrated in FIG. 16 in order to use the direct board, the host mobile communication terminal 100 displays the menu including the direct board as illustrated in FIG. 17.] The user having checked the menu of FIG. 17 may select the direct board by pressing a number key 1 or by moving a cursor by means of a direction key in order to use the direct board. If the user selects the direct board in a state in which the menu of FIG. 17 is displayed, the host mobile communication terminal 100 executes the direct board. FIG. 18 illustrates a screen including an image drawn by the user in a state in which the direct board has been executed.

Figure 19:
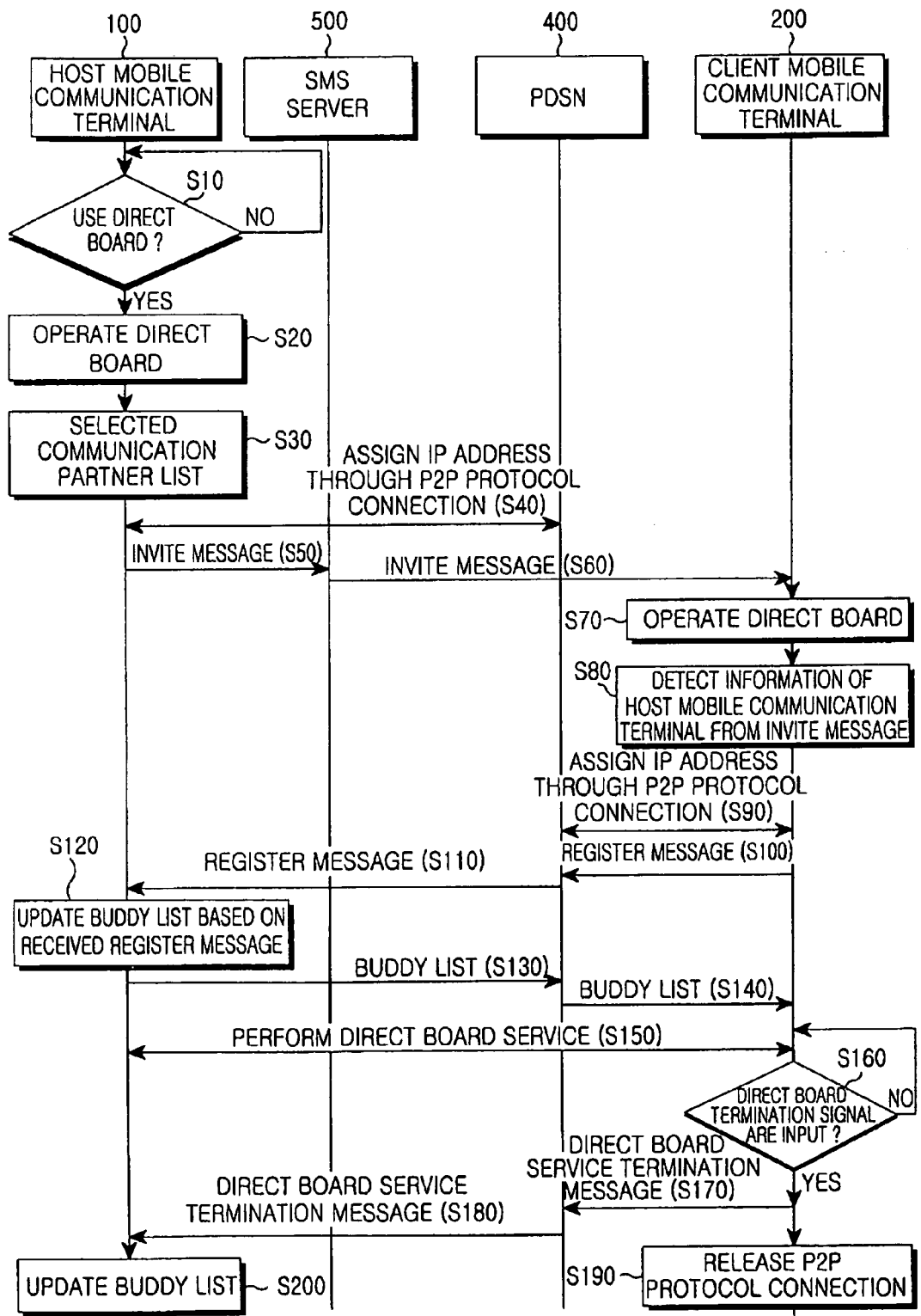
FIG. 19 is a flow diagram of a process of transmitting in real-time images drawn on direct boards of a host mobile communication terminal and a client mobile communication terminal according to a preferred embodiment of the present invention.

FIG. 19 is a flow diagram illustrating a process of transmitting in real-time images drawn on the direct boards of the host mobile communication terminal and the client mobile communication terminal according to the present invention.

The host mobile communication terminal 100 is in a voice communication state, providing a messenger service, or is in a waiting state. In this state, the host mobile communication terminal 100 determines if a command for using the direct board is input (S10). If the command for using the direct board is input, the host mobile communication terminal 100 executes the direct board (S20). If signals selected by a user are input for the direct board, who belongs to users corresponding to client mobile communication terminals, the host mobile communication terminal 100 generates a buddy list corresponding to a selected communication partner list (S30).

After generating the buddy list, the host mobile communication terminal 100 performs a P2P protocol connection with the PDSN 400, and receives an IP address from the PDSN 400 (S40). Then, the host mobile communication terminal 100 transmits an invite message to the SMS server 500 in the form of an SMS message, which includes information for the received IP address, ID information of the host mobile communication terminal 100, and port number information (S50). The SMS server 500 transmits the received invite message to the client mobile communication terminal 200 (S60).

If the invite message is received, the client mobile communication terminal 200 determines that the received message corresponds to a message for the direct board, and executes the direct board (S70). The client mobile communication terminal 200 detects the information of the host mobile communication terminal 100 from the invite message (S80). Herein, the information of the host mobile communication terminal 100 includes the information for the IP address of the host mobile communication terminal 100, the ID information of the host mobile communication terminal 100, the port number information, etc.

The client mobile communication terminal 200 receives an IP address through a P2P protocol connection with the PDSN 400 (S90). Then, the client mobile communication terminal 200 transmits a register message including the received IP address to the PDSN 400 (S100). The register message includes UDP information, port number information, and authentication information in addition to the information for the IP address. The PDSN 400 transmits the received register message to the host mobile communication terminal 100 (S110).

The host mobile communication terminal 100 updates the buddy list selected for communication based on the received register message (S120). Then, the host mobile communication terminal 100 transmits the updated the buddy list to the PDSN 400 (Sl30). The PDSN 400 transmits the received buddy list to the client mobile communication terminal 200 (S140). If the host mobile communication terminal 100 shares the buddy list, which includes information for the same communication partners, with the client mobile communication terminal 200, the host mobile communication terminal 100 and the client mobile communication terminal 200 perform the direct board service therebetween (S150).

Figure 20:
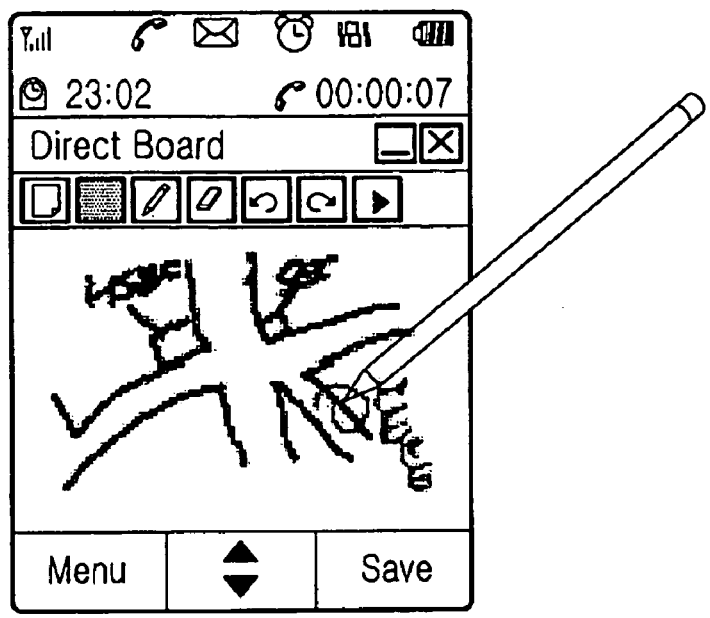
FIGS. 20 to 23 are diagrams illustrating image data transmitted in real-time according to a preferred embodiment of the present invention.

For example, in step 150, the user of the host mobile communication terminal 100 makes a sketch map showing the way to the location of an appointment with the stylus pen as illustrated in FIG. 20. The host mobile communication terminal 100 transmits data constituting the drawn image to the client mobile communication terminal 200, which includes the direction information of the image line, the color information, the thickness information and the information reporting the beginning or ending of one image line. Accordingly, the client mobile communication terminal 200 displays the image on the input unit 1000 of its own direct board based on the data transmitted from the host mobile communication terminal 100, as the user of the host mobile communication terminal 100 directly makes the sketch map.

Figure 21:
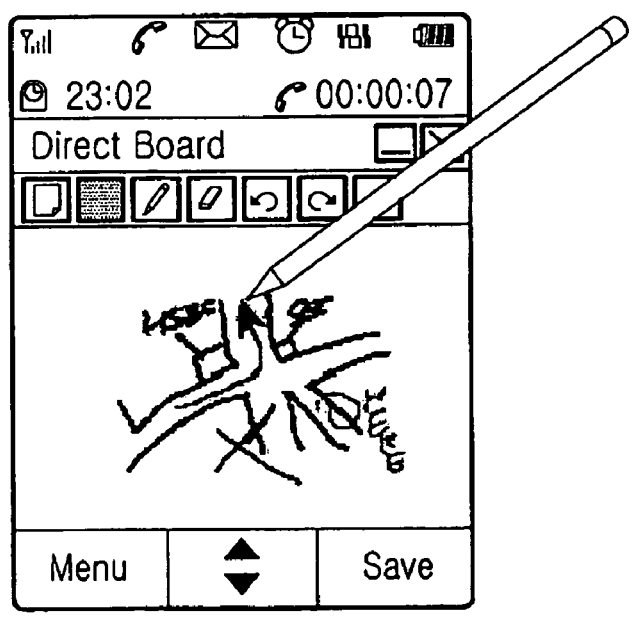

While the image is transmitted and displayed in real-time between the host mobile communication terminal 100 and the client mobile communication terminal 200, each user can continuously communicate with each other. Accordingly, the user of the client mobile communication terminal 200 can transfer additional questions to the host mobile communication terminal 100 through voice communication while watching the sketch map drawn on the direct board in real-time. The user of the host mobile communication terminal 100 having received the question can modify the sketch map as illustrated in FIG. 21 in order to provide an additional description. The host mobile communication terminal 100 continuously transmits the image of the modified sketch map in real-time, and the client mobile communication terminal 200 displays the modified sketch map on the direct board in real-time.

Figure 22:
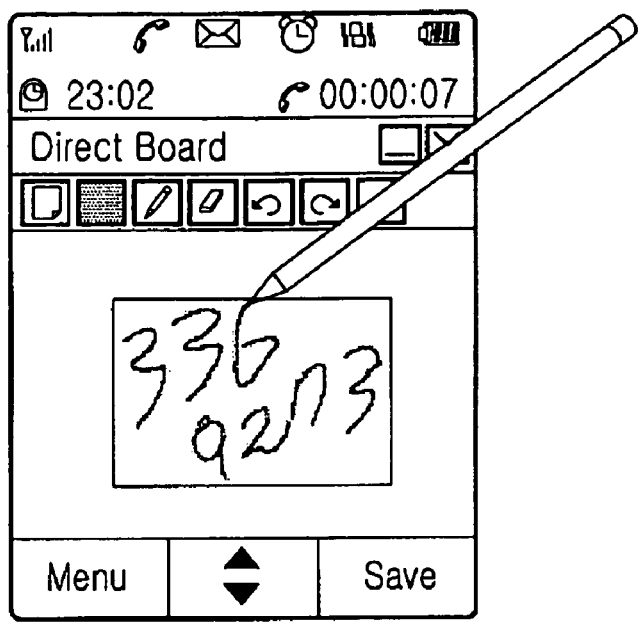

After having determined that the user of the client mobile communication terminal 200 has become aware of the location of the appointment through the voice communication, the user of the host mobile communication terminal 100 can also provide additional information, such as by drawing the phone number of the location of the appointment with the stylus pen as illustrated in FIG. 22. The client mobile communication terminal 200 also receives the image of the phone number in real-time and displays the received image on the direct board.

Figure 23:
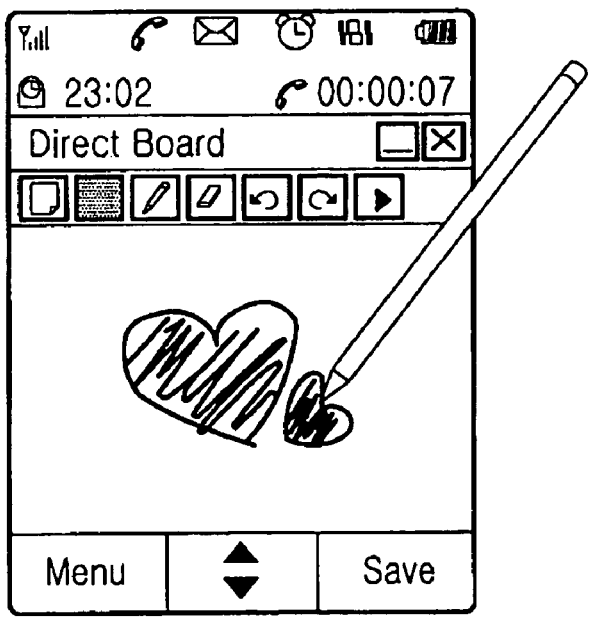

Further, the user of the client mobile communication terminal 200 can store the images drawn on the direct board in real-time. In addition, the user of the client mobile communication terminal 200 can draw images on the direct board and transmit the images to the host mobile communication terminal 100. FIG. 23 is a diagram illustrating a heart-shaped image drawn by the user of the client mobile communication terminal 200. The client mobile communication terminal 200 transmits the heart-shaped image to the host mobile communication terminal 100 in real-time. Accordingly, the host mobile communication terminal 100 displays the heart-shaped image on the direct board in real-time.

While the direct board service is performed is step 150, the client mobile communication terminal 200 determines if direct board termination signals are input (S160). If the direct board termination signals are not input, the client mobile communication terminal 200 continues to perform the direct board service with the host mobile communication terminal 100.

However, if the direct board termination signals are input, the client mobile communication terminal 200 transmits a direct board service termination message to the PDSN 400 (S170). If the direct board service termination message is received from the client mobile communication terminal 200, the PDSN 400 transmits the received direct board service termination message to the host mobile communication terminal 100 (S180). After transmitting the direct board service termination message, the client mobile communication terminal 200 releases the P2P protocol connection with the PDSN 400 (S 190). Further, if the direct board service termination message is received from the PDSN 400, the host mobile communication terminal 100 updates the buddy list (S200).

According to the present invention as described above, image data are transmitted in real-time, so that a user can exactly transfer information which may be inexactly transferred through voice communication.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for transmitting image data in real-time between mobile communication terminals in a mobile communication system, the mobile communication system including a host mobile communication terminal, at least one client mobile communication terminal, an SMS server, and a Packet Data Serving Node (PDSN), the method comprising the steps of:

when an Internet Protocol (IP) address is received from the PDSN assigning IP addresses through a Point-To-Point (P2P) protocol connection with the host mobile communication terminal and client mobile communication terminals for an application of transmitting image data in real-time, transmitting by the host mobile communication terminal an invite message including the IP address to the client mobile communication terminal via the SMS server providing an SMS service to the host mobile communication terminal and the client mobile communication terminals;

after receiving the invite message, receiving by the client mobile communication terminal an IP address from the PDSN, and transmitting a register message including the IP address to the host mobile communication terminal via the PDSN;

updating by the host mobile communication terminal a buddy list for communication partners based on the register message, and transmitting the updated buddy list to the client mobile communication terminal via the PDSN; and exchanging by the host and the client mobile communication terminals the image data in real-time with each other based on the updated buddy list, wherein the host mobile communication terminal sequentially scans and transmits horizontal and vertical coordinates of an image line to the client mobile communication terminal in a predetermined time interval, and the client mobile communication terminal sequentially receives and interconnects the horizontal and vertical coordinates to display the image in real-time.

2. The method as claimed in claim 1, wherein the image data includes color information and thickness information.

3. The method as claimed in claim 2, wherein the image line is displayed after a color and a thickness of the image line is adjusted according to the color and thickness information.

4. The method as claimed in claim 2, wherein the application corresponds to an application for generating image data through a stylus pen or a touch screen.

5. The method as claimed in claim 4, wherein all horizontal and vertical coordinates, which are scanned between horizontal and vertical coordinates scanned when the stylus pen contacts a touch pad for the first time and horizontal and vertical coordinates scanned when the stylus pen separates from the touch pad, correspond to information for forming one image line.

6. The method as claimed in claim 4, wherein the application includes an input unit for drawing images, a new sentence menu for initializing the input unit in order to draw new images, a color menu for selecting a color of an input image line, a thickness adjustment menu for adjusting thickness of the input image line, an entire deletion menu for deleting all drawn images, an execution cancellation menu for canceling drawn images, a re-execution menu for restoring the image cancelled by the execution cancellation menu, and a display menu for reproducing an image drawing process.

7. The method as claimed in claim 6, wherein the color information includes combinations of Red, Green and Blue (RGB) values.

8. The method as claimed in claim 6, wherein the thickness information includes values set through the thickness adjustment menu.

9. The method as claimed in claim 6, wherein the thickness information corresponds to thickness values of the image line drawn on the input unit in proportion to a force with which a user presses against a touch pad with the stylus pen.

10. The method as claimed in claim 1, wherein the application is executed while the host mobile communication terminal performs voice communication with the client mobile communication terminal.

11. The method as claimed in claim 1, wherein the application is executed while the host mobile communication terminal performs a messenger service with the client mobile communication terminal.

* * * * *